United States Patent
Arai

(10) Patent No.: US 9,482,866 B2
(45) Date of Patent: Nov. 1, 2016

(54) OPTICAL PROJECTION SYSTEM AND IMAGE PROJECTOR INCORPORATING THE SAME

(71) Applicant: Nobuyuki Arai, Kanagawa (JP)

(72) Inventor: Nobuyuki Arai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 2 days.

(21) Appl. No.: 14/597,437

(22) Filed: Jan. 15, 2015

(65) Prior Publication Data

US 2015/0205099 A1    Jul. 23, 2015

(30) Foreign Application Priority Data

Jan. 20, 2014  (JP) ................................ 2014-007687

(51) Int. Cl.
    *G02B 13/18*    (2006.01)
    *G02B 27/00*    (2006.01)
    *G03B 21/28*    (2006.01)
    *G02B 17/08*    (2006.01)

(52) U.S. Cl.
    CPC ........... *G02B 27/0025* (2013.01); *G02B 13/18* (2013.01); *G02B 17/08* (2013.01); *G03B 21/28* (2013.01); *G02B 27/0006* (2013.01)

(58) Field of Classification Search
    CPC ...... G03B 21/10; G03B 21/00; G03B 21/28; G03B 21/147; G02B 13/08; G02B 13/16; G02B 13/18; H04N 5/74; H04N 5/7408; H04N 5/7458; H04N 9/3105; H04N 9/3152
    See application file for complete search history.

(56) References Cited

U.S. PATENT DOCUMENTS

| 7,677,738 B2* | 3/2010 | Kuwata ................. G02B 13/16 353/77 |
| 7,922,340 B2* | 4/2011 | Ohzawa ................. G02B 17/08 353/85 |
| 2003/0063389 A1* | 4/2003 | Koyama ............ G02B 27/1026 359/618 |
| 2007/0103604 A1* | 5/2007 | Yoshikawa ............ G03B 21/10 348/781 |
| 2008/0273177 A1* | 11/2008 | Imaoka .............. G02B 17/0832 353/70 |
| 2011/0299039 A1 | 12/2011 | Yatsu |
| 2012/0081676 A1* | 4/2012 | Hirata .................... G02B 7/022 353/38 |
| 2013/0235356 A1 | 9/2013 | Takahashi et al. |
| 2014/0146295 A1* | 5/2014 | Tatsuno ................ G02B 13/16 353/98 |
| 2014/0340658 A1 | 11/2014 | Takano et al. |

FOREIGN PATENT DOCUMENTS

| JP | 2011-242606 | 12/2011 |
| JP | 2011-253023 | 12/2011 |

* cited by examiner

*Primary Examiner* — Sultan Chowdhury
(74) *Attorney, Agent, or Firm* — Oblon, McClelland, Maier & Neustadt, L.L.P.

(57) ABSTRACT

An optical projection system enlarges an image on an image display element and projects the enlarged image onto a screen. The system includes the image display element, a first optical system including lens groups arranged in order from an image display element side, a lens barrel holding the lens groups, and a free-form surface lens rotationally asymmetric and made from plastic, and a second optical system including a curved mirror disposed after the first optical system, wherein the free-form surface lens is formed to decrease in thickness from an intersection point between a surface of the free-form surface lens and an optical axis of the first optical system to an outer periphery of the lens along a line extending to the outer periphery.

9 Claims, 15 Drawing Sheets

DISTORTED SHAPE ON SCREEN

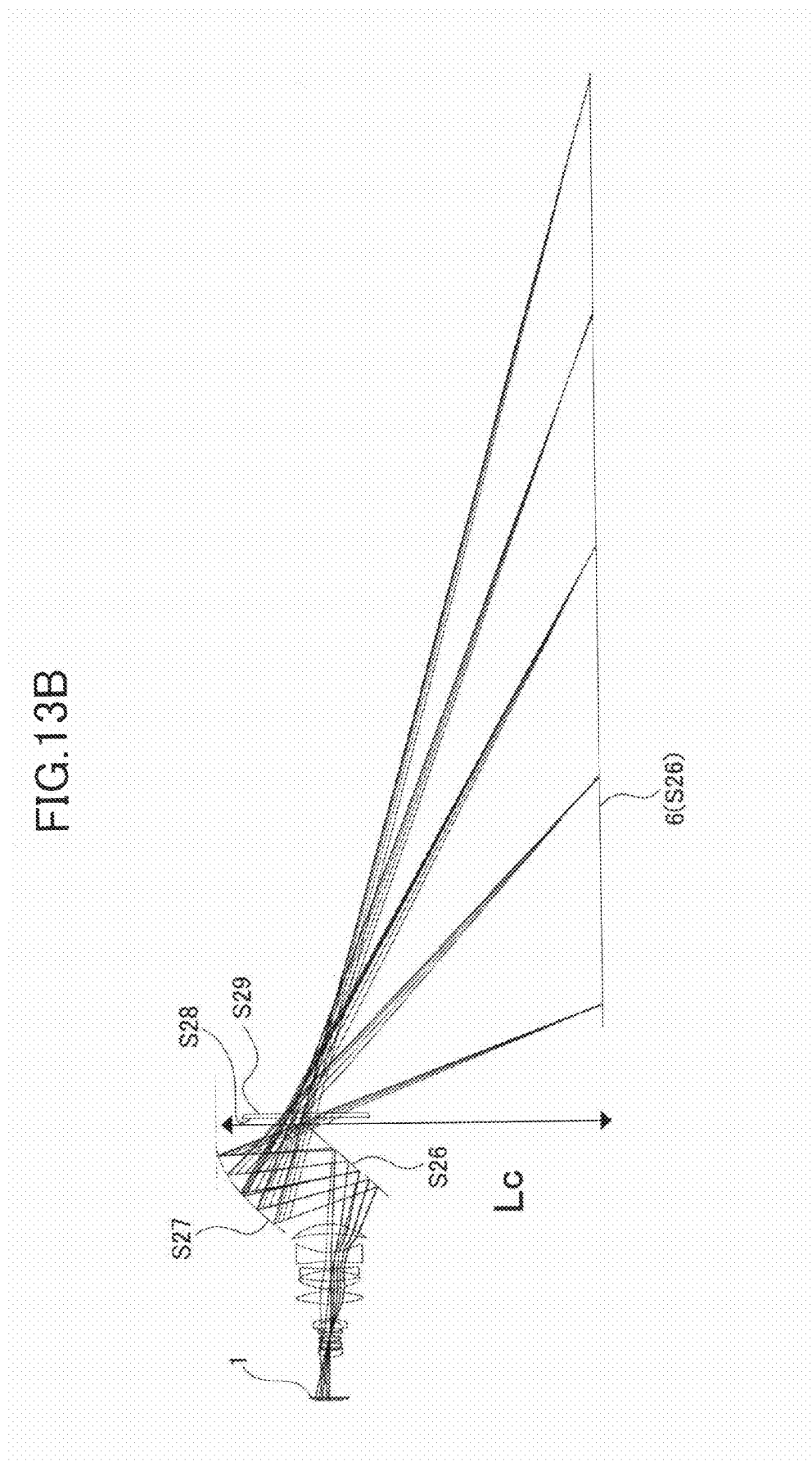

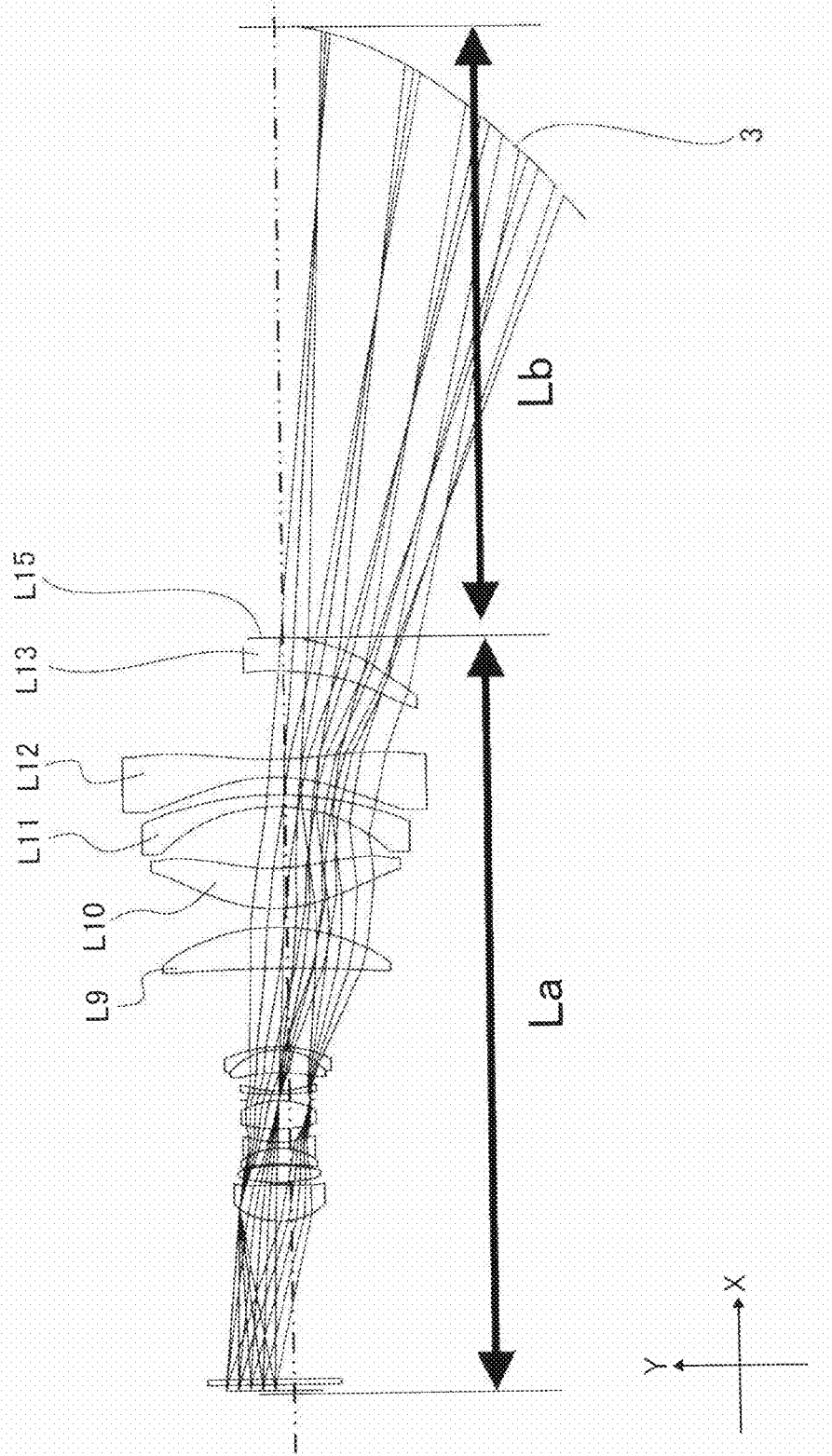

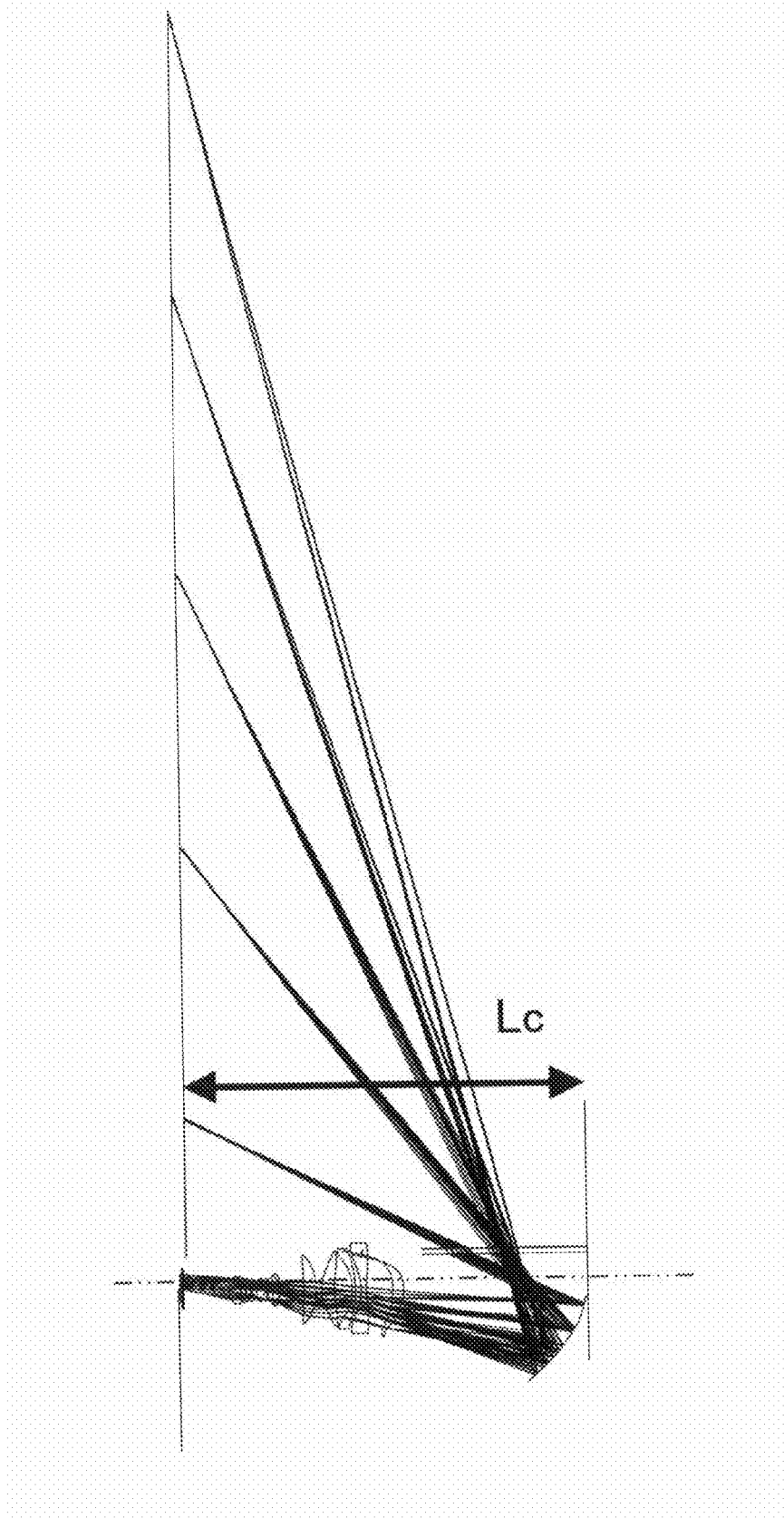

OPTICAL PROJECTION SYSTEM AND IMAGE PROJECTOR INCORPORATING THE SAME

CROSS REFERENCE TO RELATED APPLICATION

The present application is based on and claims priority from Japanese Patent Application No. 2014-007687, filed on Jan. 20, 2014, the disclosure of which is hereby incorporated by reference in its entirety.

BACKGROUND OF THE INVENTION

1. Field of the Invention

The present invention relates to an optical projection system for projecting an enlarged image of an image displayed on an image display element onto a projection plane such as a screen as well as to an image projector incorporating such an optical projection system.

2. Description of the Related Art

An image projector comprises a lamp as a light source, an image display element such as a light valve including a DMD (Digital Micromirror Device) or a crystal liquid display panel, and an optical projection system. The display of the image display element is illuminated with a light beam from the lamp and an enlarged image of an image on the display surface is projected onto a screen as a projection plane with the optical projection system. DMD as an image display element includes a large number of micromirrors each of which angle is electrically controllable in a range of +12 to −12 degrees. For example, an incidence angle of light on the DVD is set such that reflected light by a single micromirror at an angle of −12 degree is incident on the optical projection system but reflected by the micromirror at an angle of +12 degrees is not incident on the optical projection system. Thereby, it is possible to form a digital image on the display of the DMD and project the image on the screen via the optical projection system by controlling the tilt angle of each micromirror of the DMD.

In recent years an ultra-short throw projector has been widespread, which can project an image on a screen placed in a very short distance. Such an ultra-short throw projector aims to avoid projected light from entering the eyes of a presenter or a speaker present close to the screen and avoid placing a projector around audience of a presentation to prevent the audience from suffering discharged air and noise from the projector.

A liquid crystal projector is a well-known image projector and has been advanced in terms of high resolution and improved brightness along with development of a high-efficiency lamp and price reduction. Also, a light-weight compact image projector adapting DMD is available and widely used not only in offices and schools but also at home.

Furthermore, there have been demands for downsizing a projector body and shortening a projection distance. In view of this, Japanese Laid-open Patent Application Publication No. 2011-253023 (Reference 1) and No. 2011-242606 (Reference 2) disclose an optical projection system and an image projector incorporating a reflection-type image forming optical system using a free form surface, for instance. Reference 1 describes an optical projection system including a free-form surface lens to correct a tilted projection. Reference 2 describes an optical projection system incorporating a free-form surface mirror. An optical system using a free-form surface mirror is effective in terms of downsizing a projector and shortening a projection distance. However, distortion and field curvature are corrected only with the free-form surface mirror, which brings enlargement of the size of the mirror. Along with an increase in the size, the free-form surface mirror becomes more extendable by a temperature change, and distortion or defocus by a temperature change is more likely to occur. The above References 1 and 2 fail to address this problem. There is an optical projection system comprising a rotationally asymmetric free-form surface lens, aiming to correct distortion and decrease projection distance. However, related art has failed to deal with a desired lens shape and a contrivance for reducing a change in distortion by a temperature change and internal birefringence of a plastic lens.

SUMMARY OF THE INVENTION

The present invention aims to provide a compact, short projection-distance optical projection system including a free-form surface lens which can reduce distortion of a projected image due to a temperature change and defocus on a screen due to internal birefringence of a plastic lens.

An optical projection system enlarges an image on an image display element and projects the enlarged image onto a screen. The optical projection system comprises the image display element, a first optical system including lens groups arranged in order from an image display element side, a lens barrel holding the lens groups, and a free-form surface lens rotationally asymmetric and made from plastic, and a second optical system including a curved mirror disposed after the first optical system, wherein the free-form surface lens is formed to decrease in thickness from an intersection point between a surface of the free-form surface lens and an optical axis of the first optical system to an outer periphery of the lens along a line extending to the outer periphery.

BRIEF DESCRIPTION OF THE DRAWINGS

Features, embodiments, and advantages of the present invention will become apparent from the following detailed description with reference to the accompanying drawings:

FIGS. 13A and 13B are cross section views of the image projector according to the second embodiment, showing the size and projection distance of the optical projection system; and FIGS. 14A, 14B are cross section views of an image projector according to a sixth embodiment, showing the size and projection distance of the optical projection system.

DETAILED DESCRIPTION OF THE PREFERRED EMBODIMENT

Figure 1:
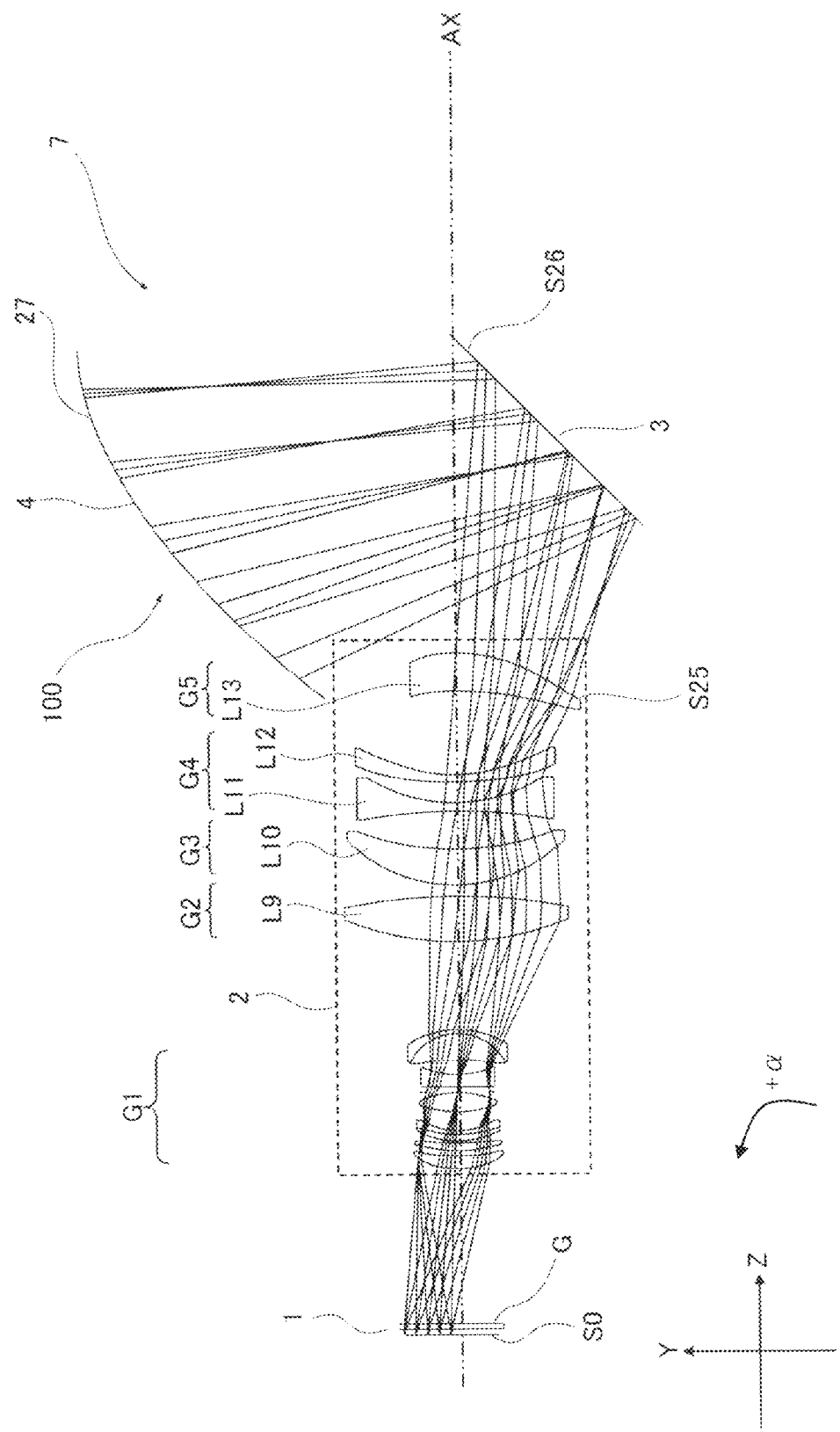
FIG. 1 is a cross section view showing configuration and optical paths of an optical projection system according to a first embodiment.

Hereinafter, embodiments of an optical projection system and an image projector comprising the optical projection system will be described in detail with reference to the accompanying drawings.

First, the concept and principle of the present invention are described. A free-form surface lens can represent a rotationally asymmetric surface shape so that it can effectively correct distortion. In addition, not a number of spherical lenses or rotationally symmetric aspheric lenses but only a single free-form surface lens can distort correction, resulting in effectively reducing the number of lenses and downsizing the optical projection system. However, the free-form surface lens is a plastic lens and about an order of magnitude larger in linear expansion coefficient than a glass lens. Because of this, it has a drawback that its shape largely changes in accordance with a temperature change. A change in distortion of a single rotationally-asymmetric, plastic free-form surface lens by a temperature change cannot be ignored. In terms of a projected image, periphery, especially, the right, left, and top sides of an image, is at a large angle relative to a screen and a slight motion of a light beam leads to a distortion of an image on the screen. In particular, this problem is prominent for a compact optical projection system which is subjected to a great temperature change during projection. With the fact that a distortion of the outer periphery is most visually conspicuous, it is essential to suppress a change in the outer peripheral shape of a lens.

Further, although the use of a free-form surface lens can bring an improvement in optical property such as distortion reduction, the free-form surface lens needs to be made from plastic, which leads to a different problem with birefringence inside the lens. Birefringence inside the lens may cause local field curvature, resulting in degrading resolution. Especially, in a short projection distance, in-focus depth of field is shallow so that only a small amount of field curvature may cause a large degradation in resolution.

In view of the above, an optical projection system according to one embodiment enlarges an image on an image display element and projects the enlarged image onto a screen conjugated with the image display element. The system comprises the image display element, a first optical system including lens groups arranged in order from an image display element side, a lens barrel holding the lens groups, and a free-form surface lens rotationally asymmetric and made from plastic, and a second optical system including a curved mirror disposed after the first optical system, wherein the free-form surface lens is formed to have a thickness which decreases from an intersection point between a surface of the free-form surface lens and an optical axis of the first optical system along a line extending to an outer periphery of the lens.

Thus, forming the thickness of the free-form surface lens to decrease along a line extending in outer circumference direction can reduce a distortion of an image on the screen by a temperature change. Further, birefringence can be suppressed by thinning the thickness of a portion of the lens corresponding to the periphery of an image at a shallow depth of field. Thereby, resolution can be maintained.

Moreover, it is preferable that a shape of the free-form surface lens is symmetric relative to an X axis along a long side of the image display element and asymmetric relative to a Y axis along a short side of the image display element, that the apex of the surface of the free-form surface lens is located at an intersection point between the X and Y axes and on the optical axis of the first optical system, that an optical effective area of the free-form surface lens is $\pm X1$ along the X axis and from $+Y1$ to $-Y2$ ($Y1<Y2$) along the Y axis, and that the thickness of the free-form surface lens is thickest at a reference point ($X=0, Y=0$) of the lens surface shape and thinnest at peripheral positions ($X=\pm X1, Y=-Y2$) along the X and Y axes.

In the periphery of an image, particularly, around the top side and right and left sides of a screen, an in-focus area (depth of field) is narrowed. At respective positions of an image, the larger the incidence angle of light on the screen, the shallower the depth of field. This is conspicuous when the projection distance is short. A shallow depth of field caused by birefringence of a plastic lens and defocus caused by field curvature significantly degrade resolution in the periphery of a projected image. This problem can be resolved by reducing the thickness of a portion of the free-form surface lens corresponding to the periphery of a projected image at a shallow depth of field. In particular it is able to further reduce the effects of birefringence on images by reducing the thickness of the free-form surface lens corresponding to a position of an image on which light is incident at a large angle relative to the screen.

Preferably, the free-form surface lens is placed furthest from the image display element in the first optical system. In the optical projection system the image display element is an element reaching a highest temperature and the other elements are subjected to less temperature change as they are away from the image display element. Sine a plastic lens has a large linear expansion coefficient, a temperature of the free-form surface lens can be suppressed by placing the lens furthest from the image display element. As a result, it is possible to prevent a distortion of an image on the screen.

Further, it is preferable to provide, at a top center of the lens, a gate of the free-form surface lens as an entrance into which resin is injected, to allow the resin to flow from a large-thickness portion to a small-thickness portion for the purpose of reducing birefringence. Also, placing the gate at the center is preferable in order to enhance symmetry. Thereby, precision of the shape of the finished free-form surface lens can be improved.

Moreover, the ratio of the thinnest portion and thickest portion of the free-form surface lens is preferably set to 0.33 or more. As described above, to reduce a distortion by a temperature change and prevent a decrease in resolution by birefringence, a thinner lens periphery is better. However, a too large difference between the lens thickest and thinnest portions decreases transferability of a mold to a lens. Therefore, the ratio of the thinnest and thickest portions of the free-form surface lens should be 1:4 or more. Thereby, good mold transferability and a precisely shaped lens can be achieved while the distortion by a temperature change and decrease in resolution due to birefringence can be avoided.

The shortest projection distance Lc of the optical projection system is set to satisfy the following relation:

$$(La+Lb)>Lc \tag{1}$$

where La is a distance on the optical axis from the image display element to the apex of a lens surface of the first optical system furthest from the image display element, and Lb is a distance on the optical axis from the apex of the lens surface to the curved mirror.

By satisfying the above condition, it is possible to downsize the entire optical projection system and the image projector. That is, the effects of the free-form surface lens are significant in an optical projection system having a very short projection distance, particularly, one having a shorter projection distance than the entire length along the optical axis. This is because a temperature of a compact optical projection system largely varies and at a short distance projection an incidence angle of light on the periphery of the screen is very large so that a depth of field of the periphery goes small. As a result, a small amount of offset of a focus position due to a little amount of birefringence greatly affects resolution.

It is preferable that the optical projection system further comprises a housing to integrally hold the first and second optical systems and a dust-proof glass. Thus, the optical projection system is sealed with the housing and dust-proof glass. Accordingly, the first and second optical systems of the optical projection system are securely supported and protected with the housing and dust-proof glass. In addition to dust prevention, it is able to prevent a decrease in the optical property, for example, an increase in the temperature of the free-form surface lens by installing a fan at an optimal position to control airflow.

Further, it is preferable to additionally provide an illumination system with a high illumination efficiency in the image projector incorporating the above optical projection system. With such a configuration it is able to provide a shorter-distance, compact image projector which can reduce image distortion due to a temperature change and prevent image degradation due to birefringence.

Figure 2:
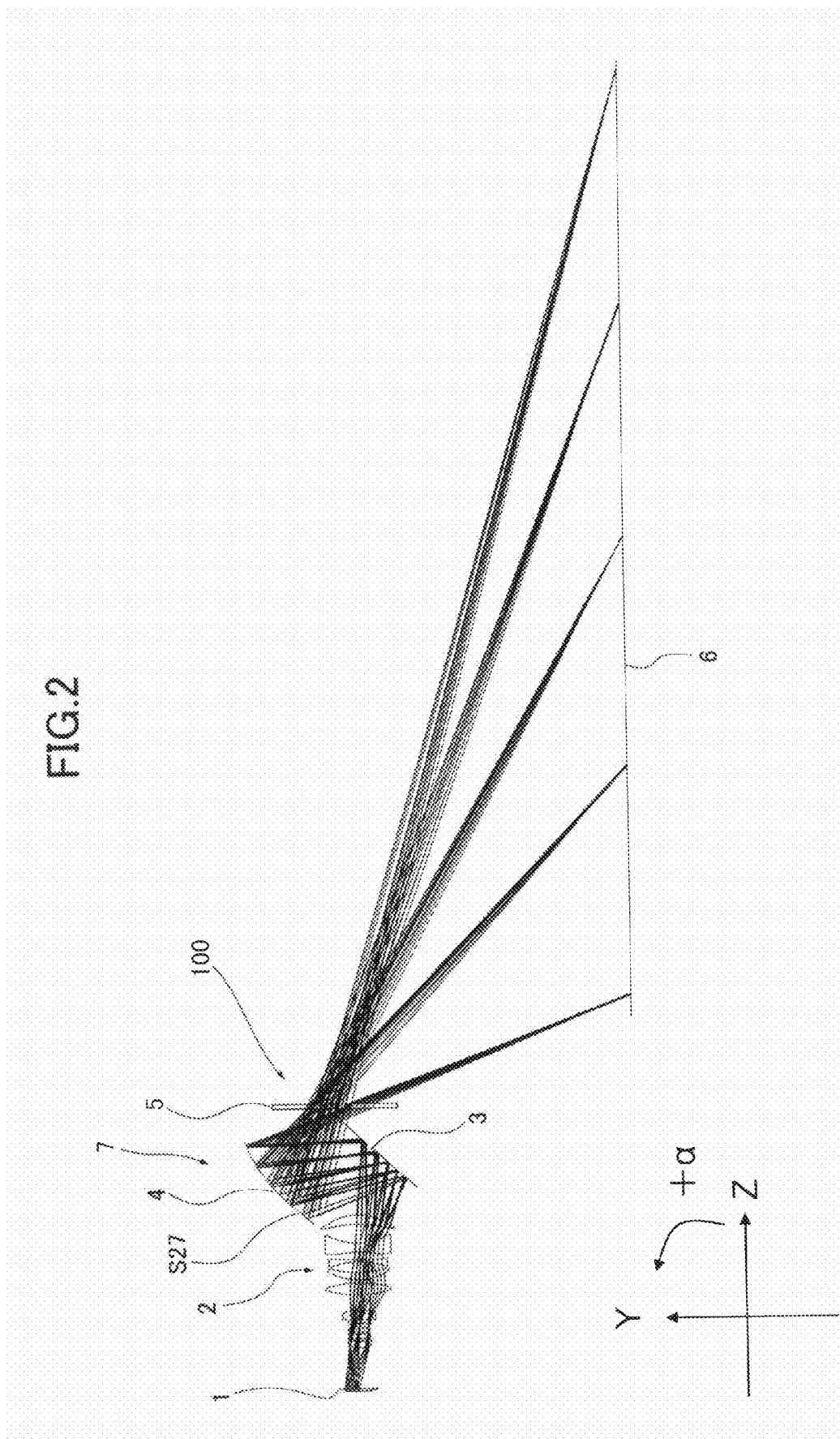
FIG. 2 is a cross section of an image projector including the optical projection system in FIG. 1 according to a second embodiment.
Figure 3:
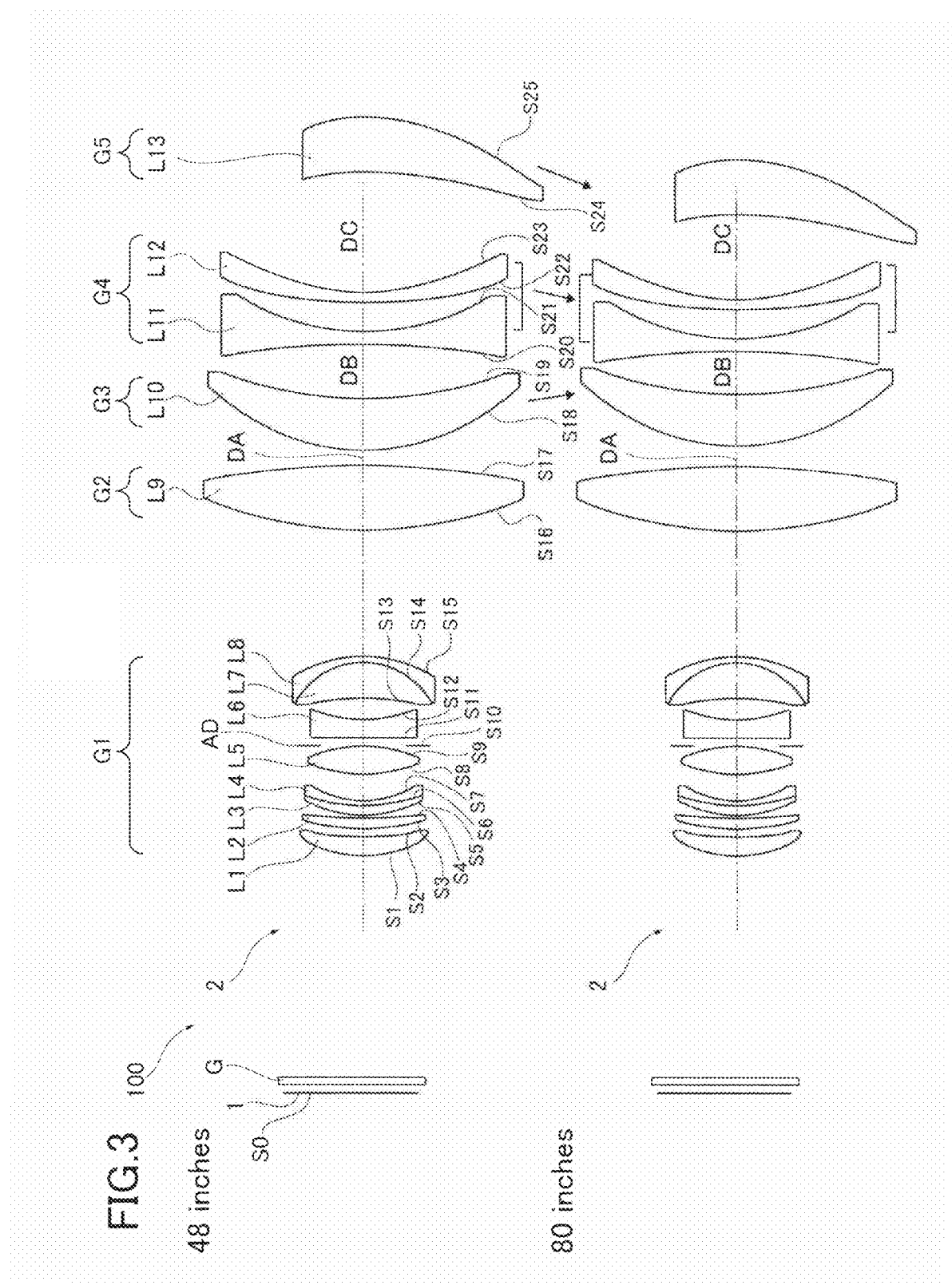
FIG. 3 shows moving positions of third to fifth lenses as a focus lens of the optical projection system according to the first embodiment when projection size is 48 inches and 80 inches.
Figure 4:
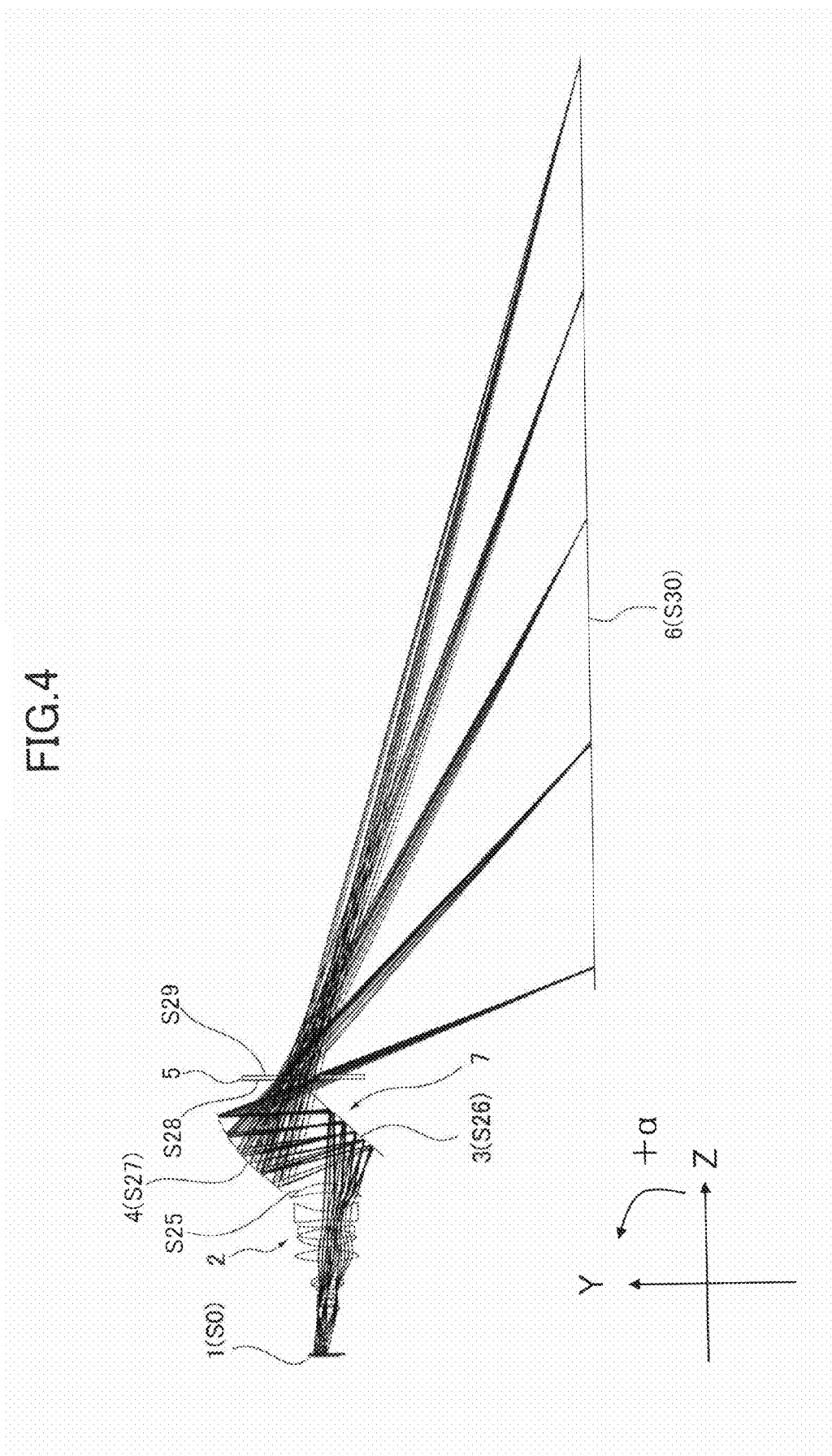
FIG. 4 shows the image projector in FIG. 2 with face numbers of a second optical system added.

Next, the structure of an optical projection system is described in detail referring to FIGS. 1 to 4. FIG. 1 is a cross section view of the structure of the optical projection system according to a first embodiment along a plane including an optical axis and with which the long side of a display of an image display element vertically intersects. FIG. 2 is a cross section of an image projector according to a second embodiment including the optical projection system in FIG. 1, showing configuration and optical paths. FIG. 3 shows moving positions of first to fifth lenses as a focus lens of the optical projection system according to the third embodiment when projection size is 48 inches and 80 inches. FIG. 4 shows the image projector in FIG. 2 with face numbers of a second optical system added. In all the embodiments and examples a DMD (Digital Micromirror Device) is used as an image display element 1. However, the image display element 1 should not be limited thereto. It can be a different light bulb, for example, an LCD (liquid crystal display) or LCOS (Liquid Crystal On Silicon).

For the sake of simple explanation the drawings omit showing an illumination system to guide light from a lamp to the light bulb. However, it is assumed that the light bulb is illuminated with the light from the lamp. The light bulb displays an image in accordance with an image signal supplied from outside. In FIG. 1 to FIG. 4 an optical projection system 100 comprises a first optical system 2 and a second optical system 7, and projects an enlarged image of an image formed on the display of the light bulb onto a screen 6 as a projection plane. The image projector enlarges and projects the image formed on the image display element 1 onto the screen 6 with the optical projection system 100, a dust-proof glass 5, and a not-shown illumination system. The first optical system 2 in FIG. 3 comprises first to fifth lens groups G1 to G5 and an aperture diaphragm AD. The second optical system 7 comprises a returning mirror 3 and a free-form surface mirror 4 as free-form surface concave mirror, and the dust-proof glass 5 is a transmissive optical plate.

In the first optical system 2 the first lens group G1 comprises first to fifth lenses L1 to L5, the aperture diaphragm AD, and sixth to eighth lenses L6 to L8 arranged in order from the image display element 1 to the projection plane. The first lens L1 is a positive meniscus lens having a convex surface on an image display element side and aspheric surfaces on both sides. That is, the first lens L1 is a rotationally symmetric aspheric lens. The second lens L2 is a positive meniscus lens having a convex surface on the image display element side. The third lens L3 is also a positive meniscus lens having a convex surface on the image display element side. The fourth lens L4 is a negative meniscus lens having a concave surface on a projection plane (screen 6) side. The third and fourth lenses L3 and L4 are a cemented lens.

The fifth lens L5 is a positive biconvex lens having a convex surface at a larger curvature on the projection plane side than the image display element side. The aperture diaphragm AD is provided on the projection plane side of the fifth lens L5. The sixth lens L6 is a negative biconcave lens having a concave surface at a larger curvature on the projection plane side than the image display element side. The seventh lens L7 is a positive meniscus lens having a concave surface on the image display element side and a convex surface on the projection plane side. The eighth lens L8 is a negative meniscus lens having a concave surface on the image display element side. The seventh and eighth lenses L7 and L8 are a cemented lens.

Further, the second lens group G2 comprises a ninth lens L9 which is a positive biconvex lens having a convex surface at a larger curvature on the image display element side than the projection plane side. The third lens group G3 comprises a tenth lens L10 which is a positive meniscus lens having a convex surface on the image display element side. The fourth lens group G4 comprises eleventh and twelfth lenses L11 and L12 arranged in this order from the image display element side.

The eleventh lens L11 is a negative biconcave lens having a concave surface at a larger curvature on the projection plane side than the image display element side. The twelfth lens L12 is a negative meniscus lens having a concave surface on the projection plane side and a rotationally symmetric aspheric lens having aspheric surfaces on both sides. The fifth lens group G5 comprises a thirteenth lens L13 which is a free-form surface lens 13 as described later.

Thus, the first optical system 2 is comprised of 5 groups, 13 lenses. The image display element 1 is illuminated with light from the not-shown illumination system and the light is two-dimensionally modified in intensity by an image displayed on the element 1 and incident on the first optical system 2. The light beam exited from the first optical system 2 is incident on and returned by the returning mirror 3 to the free-form surface mirror 4 of the second optical system 7. The returning mirror 3 is a planar mirror to return the optical path of the light beam in a certain direction. Alternatively, the returning mirror 3 can be a curved mirror having an optical property.

The light beam exited from the first optical system 2 forms an intermediate image of the image displayed on the image display element 1. The intermediate image is formed in a space between the returning mirror 3 and the free-form surface mirror 4 in FIG. 1. The code AX in FIG. 1 represents the optical axis of the first optical system 2. The intermediate image is enlarged by the free-form surface mirror 4 and projected onto the screen 6 in FIGS. 2 and 4. FIG. 2 shows the optical arrangement of the image projector when the light beam from the optical projection system 100 forms an enlarged image on the screen 6. The dust-proof glass 5 is disposed between the free-form surface mirror 4 and the screen 6 in FIG. 2, to air-tightly seal the image projector with a later-described housing in FIG. 8 for dust prevention. Herein, a vertical direction in the drawings and in parallel to the image formed on the image display element 1 is defined to be Y-direction, and a direction orthogonal to Y-direction is defined to be Z-direction. Z-direction is along the optical axis of the first optical system 2. As shown in FIG. 2, upper side is +Y side and left side is +Z side.

The optical axis of the optical projection system refers to the optical axis AX of the first optical system 2 extending to the screen 6 and returned by the returning mirror 3 and free-form surface mirror 4 in order. In a plane (parallel to FIG. 2) including the optical axis of the optical projection system an arbitrary angle α rotated counterclockwise from the Z axis is set.

Referring to FIG. 3, the display surface S0 of the image display element 1 and the surfaces S1 to S25 of the 13 lenses and aperture diaphragm of the first optical system 2 are shown. A protective glass G for the image display element 1 is provided. The surface S0 is an object surface relative to the optical projection system. The surface S10 is of the aperture diaphragm. In the drawing the left side of the first optical system 2 is an object side or reduction side (image display element side) and the right side is an image side or enlargement side (projection plane side).

In FIG. 4 the mirror surface S26 of the returning mirror 3, the mirror surface S27 of the free-form surface mirror 4, and reduction and enlargement side surfaces S28, S29 of the dust-proof glass 5, and the surface S30 of the screen 6 are shown.

FIRST EXAMPLE

Next, specific values of the optical projection system 100 according to first embodiment are described by way of example. In the following, unit of a length is mm unless otherwise noted. The numerical aperture of the object side of the first optical system 2 is 0.195. The size ratio of an image displayed on the surface S0 of the image display element 1 is 10 (vertical or in Y-direction): 16 (horizontal or in X-direction) and width across corner is 0.65 inches (165 mm). The optical axis of the first optical system 2 is offset from the center of the surface S0 by 1.541 mm in −Y-direction. The optical property of each optical element of the optical projection system 100 is shown in the following Table 1. The codes in Table 1 represent as follows.

S0 to S30: surface numbers
R: curvature radius
D: surface interval
Nd: refractive index of d-line
vd: Abbe number
DA to DD: variable intervals

TABLE 1

| FACE NO. | R CURVATURE RADIUS | D INTERVAL | nd REFRACTIVE INDEX | vd DISPERSION |
|---|---|---|---|---|
| S0 | inf | 30.00 | | |
| S1 * | 17.628 | 2.40 | 1.5150 | 63.4 |
| S2 * | 104.764 | 0.92 | | |
| S3 | 26.644 | 1.38 | 1.7174 | 29.5 |
| S4 | 67.646 | 0.36 | | |
| S5 | 16.589 | 1.20 | 1.4970 | 81.1 |
| S6 | 22.606 | 0.65 | 1.9020 | 25.1 |
| S7 | 12.736 | 3.43 | | |
| S8 | 20.250 | 3.50 | 1.4970 | 81.5 |
| S9 | −16.929 | 0.10 | | |
| S10 | inf | 1.00 | | |
| S11 | −486.063 | 2.20 | 1.8830 | 40.7 |
| S12 | 16.491 | 2.68 | | |
| S13 | −36.485 | 4.70 | 1.5174 | 52.4 |
| S14 | −9.693 | 0.65 | 1.8830 | 40.7 |
| S15 | −17.058 | 15.95 | | |
| S16 | 52.875 | 8.22 | 1.7847 | 25.6 |
| S17 | −103.993 | VARIABLE DA | | |
| S18 | 28.066 | 6.52 | 1.7200 | 50.2 |
| S19 | 50.793 | VARIABLE DB | | |
| S20 | −99.823 | 1.50 | 1.8666 | 23.7 |
| S21 | 30.047 | 3.78 | | |
| S22 * | 84.962 | 1.22 | 1.5305 | 55.8 |
| S23 * | 24.597 | VARIABLE DC | | |
| S24 | inf | 6.86 | 1.5305 | 55.8 |
| S25 | inf | ****** | | |
| S26 | inf | ****** | | |
| S27 | inf | ****** | | |
| S28 | inf | 3.00 | 1.516798 | 64.1 |
| S29 | inf | VARIABLE DD | | |
| S30 | | | | |

In Table 1 face numbers with asterisk * added, that is, S1, S2, S22, and S23, are aspheric surfaces. The aspheric shapes are defined by the following expression:

$$Z(h) = \frac{(1/R) \cdot h^2}{1 + \sqrt{1-(1+K)\cdot(h/R)^2}} + \Sigma A_i \cdot h^i \quad (2)$$

where C is an inverse number of paraxial curvature radius R, h is height from the optical axis, K is a conical constant, Ai is each order aspheric coefficient, and i takes 1 to 10. Z (h) is a total aspheric amount along the optical axis.

The aspheric coefficients are shown in the following Table 2. In the table En represents a power of 10, ×10n, for example, E-05 represents ×10$^{-5}$.

TABLE 2

| | S1 | S2 | S22 | S23 |
|---|---|---|---|---|
| R | 17.628 | 104.764 | 84.96203104 | 24.59714508 |
| K | 0 | 0 | 0 | 0 |
| A1 | 0.000E+00 | 0.000E+00 | 0.000E+00 | 0.000E+00 |
| A2 | 0.000E+00 | 0.000E+00 | 0.000E+00 | 0.000E+00 |
| A3 | 0.000E+00 | 0.000E+00 | 0.000E+00 | 0.000E+00 |
| A4 | 6.822E−05 | 1.419E−04 | 1.033E−05 | −3.273E−05 |
| A5 | 0.000E+00 | 0.000E+00 | 0.000E+00 | 0.000E+00 |
| A6 | 8.371E−07 | 1.095E−06 | −2.666E−08 | 2.905E−08 |

TABLE 2-continued

|  | S1 | S2 | S22 | S23 |
|---|---|---|---|---|
| A7 | 0.000E+00 | 0.000E+00 | 0.000E+00 | 0.000E+00 |
| A8 | 1.616E−09 | 3.436E−09 | 1.082E−10 | −1.421E−11 |
| A9 | 0.000E+00 | 0.000E+00 | 0.000E+00 | 0.000E+00 |
| A10 | 1.455E−10 | 1.991E−10 | −8.018E−14 | −1.606E−14 |

In Table 1 the variable interval DA is between the second and third lens groups G2 and G3 or the lens surfaces S17 and S18. The variable interval DB is between the third and fourth lens groups G3 and G4 or the lens surfaces S19 and S20. The variable interval DC is between the fourth and fifth lens groups G4 and G5 or the lens surfaces S23 and S24. The variable interval DD is between the surface S29 of the dust-proof glass 5 and the projection plane S30 of the screen 6. Thus, the optical projection system 100 is a zooming system and the third to fifth lens groups G3 to G5 are movable as indicated by the arrow in FIG. 3 to vary the intervals DA to DD and change an enlargement rate. Thereby, the width across corner of a projected image is adjusted to 48 to 80 inches for focusing in accordance with a projection size. The variable intervals DA to DD are varied relative to the values of the width across corner 80, 60, 48 inches, as shown in the following Table 3.

TABLE 3

| VARIABLE | FACE NO. | 80 inches | 60 inches | 48 inches |
|---|---|---|---|---|
| DA | S17-S18 | 2.77 | 2.52 | 2.00 |
| DB | S19-S20 | 6.53 | 6.69 | 6.92 |
| DC | S23-S24 | 10.22 | 12.86 | 15.26 |
| DD | S29-S30 | 378.36 | 292.98 | 241.44 |

Next, Table 4 shows Y and Z coordinates of the surface S26 of the returning mirror 3, the surface S25 of the thirteenth lens L13 as free-form surface lens, the surface S27 of the free-form surface mirror 4, and the surface S28 of the dust-proof glass 5 when the apex of the surface S1 of the image display element 1 is set to a reference point (Y, Z)=(0, 0). In FIG. 3 and 4+Y-direction is upward and +Z-direction is rightward. The angle α is an angle rotated counterclockwise from +Z direction.

TABLE 4

|  | Y | Z | α |
|---|---|---|---|
| S25 | 0 | 88.75(80 inch) | 0 |
|  |  | 91.30(60 inch) |  |
|  |  | 93.40(48 inch) |  |
| S26 | 0.000 | 142.96 | −44.9374 |
| S27 | 75.080 | 148.49 | −102.8391 |
| S28 |  | 162.96 | 0 |

The thirteenth lens L13 has a free-form surface and is represented by the following expression (3) using X and Y coordinates with apexes of the surfaces S24 and S25 (X=Y=0) set to an origin. Likewise, the mirror surface of the free-form surface mirror 4 is represented by the expression (3) using the X and Y coordinates with apexes (at YZ coordinates shown in Table 4) of the surfaces S28 set to an origin.

$$Z(x, y) = \frac{(1/R) \cdot (x^2 + y^2)}{1 + \sqrt{\{1 - (1 + K) \cdot (x^2 + y^2) \cdot (1/R)^2\}}} + \Sigma C_j \cdot x^m \cdot x^n \quad (3)$$

where Z(x, y) represents a free-form amount along the optical axis AX, R is a paraxial curvature radius, K is a conic coefficient, and C is a free-form coefficient. In this expression $h = x^2 + y^2$ holds true. xy coordinates are parallel to XY coordinates, their positive orientations are the same as those of XY coordinates and h is a height from the optical axis.

The free-form coefficients of the surfaces S24, S25, and S27 are shown in the following Table 5. In the table C14:$x^4 * y^2$ denotes that C14 is a coefficient of x4y2, for instance.

TABLE 5

|  | S25 | S26 | S28 |
|---|---|---|---|
| Y CURVATURE RADIUS | inf | inf | inf |
| C1: Conic constant | 0 | 0 | 0 |
| C2: y | 0 | 0 | 0 |
| C3: $x^2$ | −8.120E−03 | −1.690E−02 | 1.282E−02 |
| C4: $y^2$ | −1.077E−02 | −1.989E−02 | 1.573E−02 |
| C5: $x^2 * y$ | −3.458E−04 | −2.941E−04 | −1.758E−04 |
| C6: $y^3$ | −4.993E−04 | −5.939E−04 | −1.565E−05 |
| C7: $x^4$ | 2.383E−06 | −2.964E−07 | −1.514E−06 |
| C8: $x^2 * y^2$ | −8.310E−05 | −5.492E−05 | −6.569E−06 |
| C9: $y^4$ | −3.960E−05 | −5.472E−05 | 7.171E−07 |
| C10: $x^4 * y$ | 1.328E−06 | 3.009E−07 | 6.522E−08 |
| C11: $x^2 * y^3$ | −7.257E−06 | −1.335E−06 | −3.189E−08 |
| C12: $y^5$ | −7.606E−07 | −1.942E−06 | 4.951E−08 |
| C13: $x^6$ | −4.182E−08 | −2.832E−08 | 5.451E−10 |
| C14: $x^4 * y^2$ | 4.739E−07 | 9.667E−08 | 3.756E−09 |
| C15: $x^2 * y^4$ | −2.802E−07 | 2.672E−07 | 3.200E−10 |
| C16: $y^6$ | 5.842E−08 | 1.092E−08 | 5.460E−10 |
| C17: $x^6 * y$ | 1.391E−09 | 3.364E−09 | −9.585E−12 |
| C18: $x^4 * y^3$ | 4.257E−08 | 8.983E−10 | 2.686E−11 |
| C19: $x^2 * y^5$ | −6.120E−10 | 2.210E−08 | −2.131E−11 |
| C20: $y^7$ | 1.910E−09 | 2.548E−09 | −5.015E−12 |
| C21: $x^8$ | 2.053E−10 | 9.102E−11 | −1.100E−13 |
| C22: $x^6 * y^2$ | 7.540E−11 | 7.508E−10 | −8.511E−13 |
| C23: $x^4 * y^4$ | 1.460E−09 | −5.984E−10 | −5.334E−13 |
| C24: $x^2 * y^6$ | 3.809E−10 | −6.242E−11 | −1.209E−13 |
| C25: $y^8$ | −1.021E−10 | −3.067E−12 | −4.527E−14 |
| C26: $x^8 * y$ | −2.198E−12 | −2.096E−12 | −9.660E−16 |
| C27: $x^6 * y^3$ | 4.370E−12 | 5.424E−11 | −1.184E−14 |
| C28: $x^4 * y^5$ | 1.187E−11 | −3.838E−11 | −4.645E−15 |
| C29: $x^2 * y^7$ | 6.045E−12 | −6.429E−11 | 7.594E−15 |
| C30: $y^9$ | −6.748E−12 | −4.033E−12 | 1.217E−15 |
| C31: $x^{10}$ | −2.118E−13 | −1.009E−14 | 7.498E−18 |
| C32: $x^8 * y^2$ | −3.300E−13 | −3.592E−13 | 1.317E−17 |
| C33: $x^6 * y^4$ | 7.617E−14 | 1.342E−12 | −3.308E−17 |
| C34: $x^4 * y^6$ | 7.352E−15 | −6.329E−13 | 3.154E−17 |
| C35: $x^2 * y^8$ | −3.076E−13 | −1.856E−12 | 8.325E−17 |
| C36: $y^{10}$ | −9.931E−14 | −6.344E−14 | 1.355E−17 |

Figure 9:
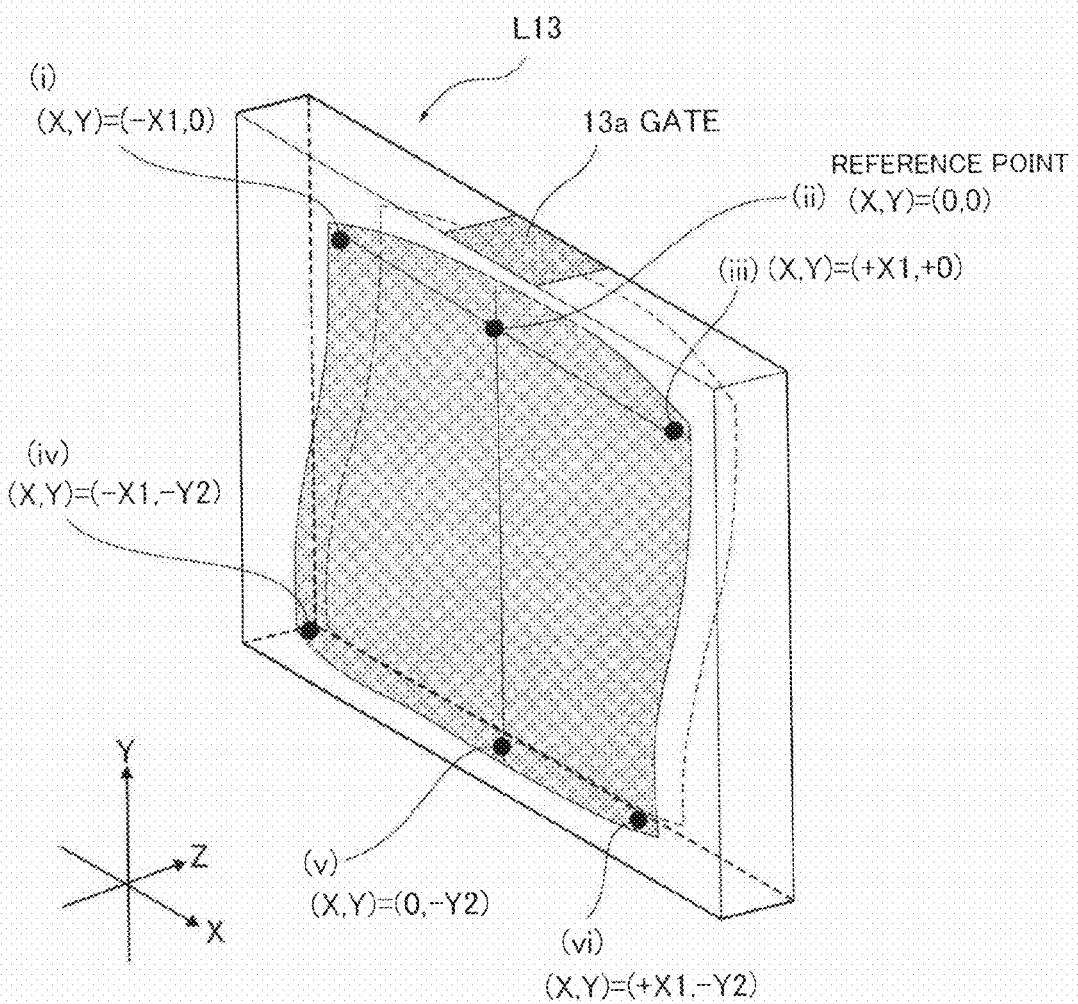
FIG. 9 is a perspective view of the outer shape of a free-form surface lens of a second optical system of the optical projection system.

FIG. 9 shows the outer form of the thirteenth lens L13 as a free-form surface lens which comprises a free-form surface and a not-shown rib outside of the lens surface, and a gate 13a. A not-shown positioning element is provided on the rib to secure the lens in the lens barrel or housing by adhesive bonding or with a spring. The gate 13a is provided on the center of a top side of the lens in Y-direction, into which resin is injected for forming a lens. With the gate 13a positioned as above, it is possible to improve the liquidity of resin and the accuracy at which a lens shape is transferred into a mold.

The thicknesses of the thirteenth lens L13 at different positions (i) to (vi) along Z axis are shown in the following Table 6.

TABLE 6

| | X COORDINATE | Y COORDINATE | THICKNESS ALONG Z AXIS |
|---|---|---|---|
| (i), (iii) | ±16.0 | 0 | 4.74 |
| (ii) | 0 | 0 | 5.97 |
| (iv), (vi) | ±16.0 | −20.7 | 2.03 |
| (v) | 0 | −20.7 | 3.78 |

Herein, the lens thickness is defined to be spacing between each position of the surfaces relative to Z axis orthogonal to X and Y axes. The optical effective area of the lens L13 is +16.0 mm along X axis and 0 to −20.7 mm along Y axis. The six points, four corners of the optical effective area, reference point (X, Y)=(0, 0), and bottom center (X, Y)=(0, −20.7) are shown in the table. The thickness is largest, 5.97 mm, at the reference point (ii) (angle of view No. 1), 4.74 mm at the points (i), (iii) near the top side (angle of view No. 21), 3.78 mm at the point (v) in the bottom center (angle of view No. 5), and thinnest, 2.03 mm at the points (iv), (vi) near the bottom side (angle of view No. 25). The ratio of the thickest and thinnest portions of the free-form surface lens L13 is 2.03/5.97=0.34. Mold transferability is decreased when the size ratio of the lens shape is 0.33 or less. It is therefore preferable to form the shape of the free-form surface lens at the size ratio of larger than 0.33. Note that referring to FIG. 5, the numbers 1 to 25 are defined to be the angles of view numbers of image display regions of the image display element 1 with the optical axis of the first optical system 2 set as an original point. Further, the magnitude relation of the thicknesses at each angle of view in the periphery of the free-form surface lens is the same as that of an inverse of an incidence angle of a light beam on the screen 6 having passed through each lens position, as shown in Table 7.

TABLE 7

Figure 5:
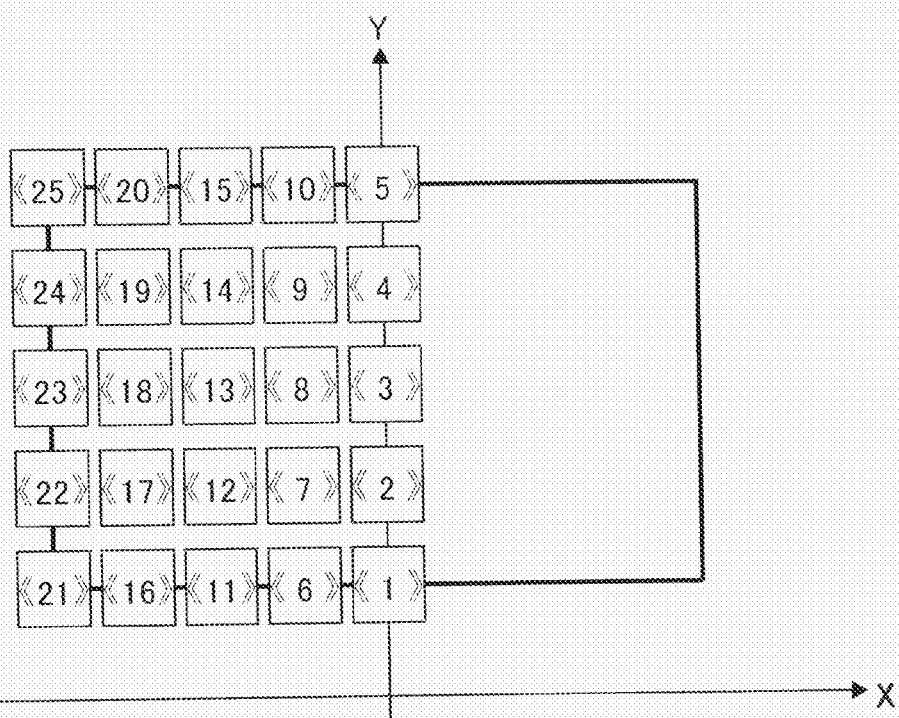
FIG. 5 shows angle of view numbers of image display regions virtually displayed on an image display element with an optical axis of a first optical system of the optical projection system set to an original point.

| POSITION ON THE LENS | ANGLE OF VIEW NO. IN FIG. 5 | THICKNESS ALONG Z AXIS (mm) | INCIDENCE ANGLE ON SCREEN (deg) |
|---|---|---|---|
| (i), (iii) | (21) | 4.74 | 69.0 |
| (ii) | (1) | 5.97 | 25.0 |
| (iv), (vi) | (25) | 2.03 | 77.6 |
| (v) | (5) | 3.78 | 75.0 |

That is, the thickness of a position of the free-form surface lens corresponding to a large angle of view or a large incidence angle on the screen, for example, No. 25 is as small as 2.03 mm. Such a shaped lens is unsusceptible to a temperature change and a change in the birefringence inside the lens. Herein, the incidence angle on the screen refers to an angle between a normal line on the projection plane and a light beam at each angle of view. The shorter the projection distance, the larger the angle between the normal line and the light beam.

Figure 8:
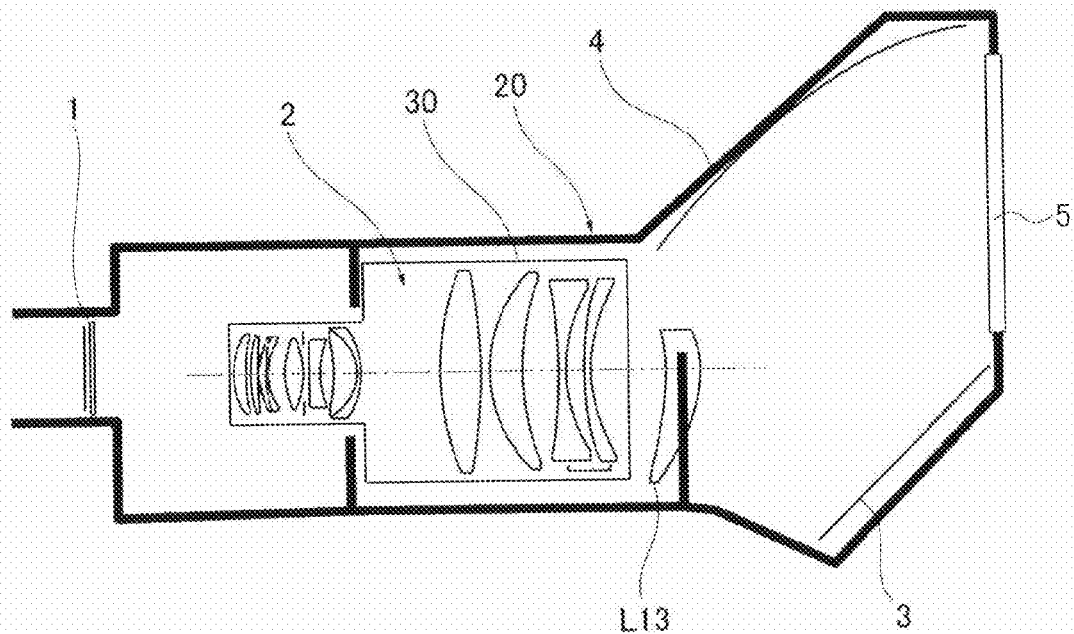
FIG. 8 is a cross section view of the structure of an image projector according to a third embodiment in which an optical projection system is supported in a housing and covered with a dust-proof glass.

Now, the structure of an image projector incorporating the optical projection system according to a third embodiment is described. FIG. 8 is a cross section view of an image projector in which the optical projection system is supported in a housing 20 which is precisely manufactured. The housing 20 integrally holds a lens barrel 30 containing the first optical system 2 except for the image display element 1 and the thirteenth lens L13 as a free-form surface lens, the returning mirror 3 and the free-form surface mirror 4. The lens barrel 30 is adjusted to hold the lenses at appropriate positions by optical axis adjustment to exert desired optical performance. Thereby, variation in the positions of the respective optical elements can be reduced. The housing 20 can be made from resin, aluminum, or magnesium by die casting.

In order to prevent dust from entering the optical system, the dust-proof glass 5 is air-tightly, integrally attached to the housing 20. Thereby, in addition to dust prevention effects, it is able to prevent an element susceptible to a temperature change (the free-form surface lens in the present embodiment) from rising in temperature by optimally designing the position of a fan to control airflow.

Figure 13A:
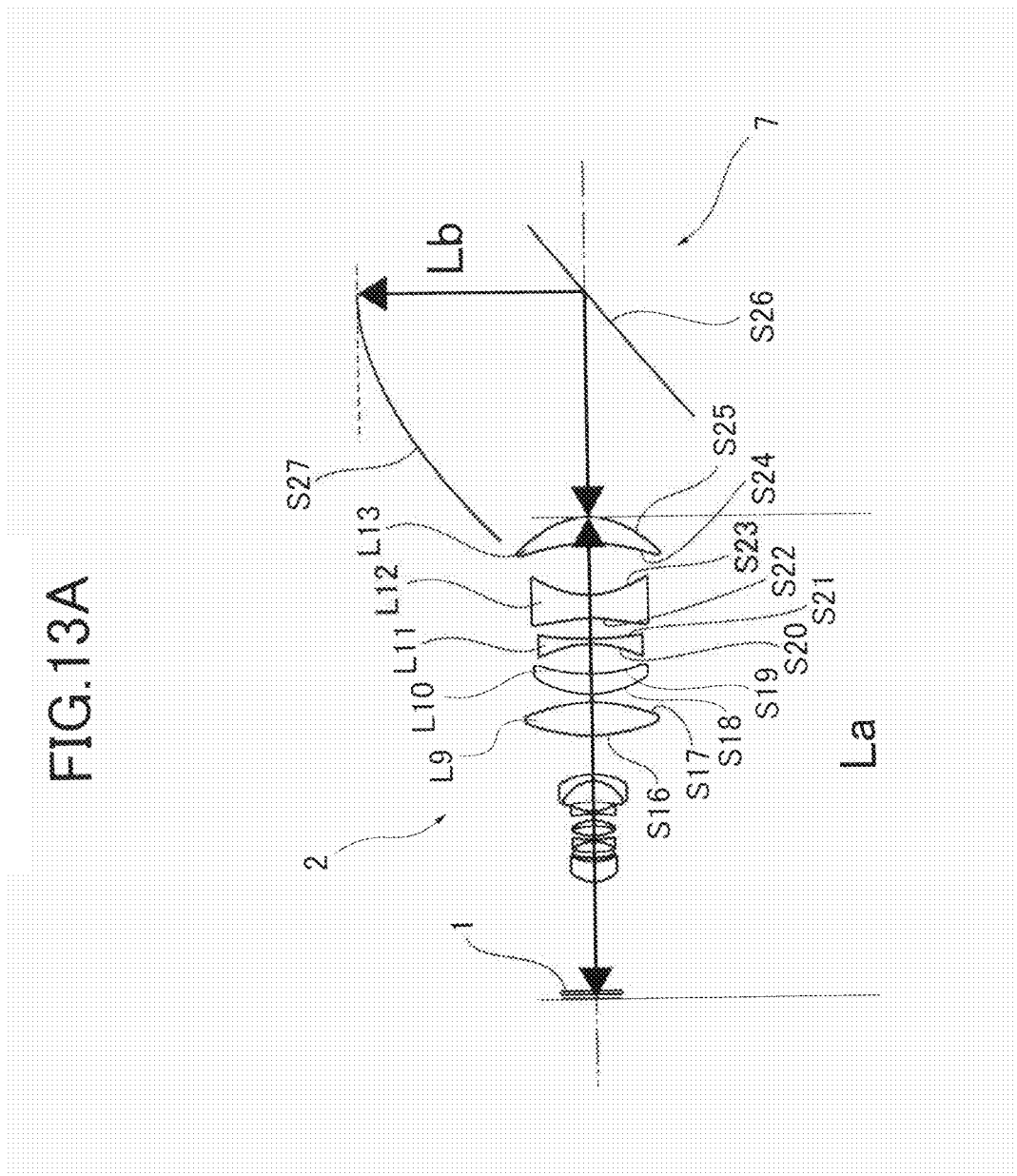

FIGS. 13A, 13B are cross section views of the optical projection system of the image projector according to the second embodiment, showing the size and the projection distances La, Lb, and Lc thereof. The projection distance La is from the image display element 1 to the apex of the lens surface S25 furthest from the image display element 1 on the optical axis. The projection distance Lb is from the apex of the lens surface S25 to the free-form surface mirror 4 on the optical axis. The projection distance Lc is a shortest projection distance.

FIGS. 14A, 14B are cross section views of the optical projection system of the image projector according to the sixth embodiment, showing the size and the projection distances La, Lb, and Lc thereof. FIGS. 14A, 14B show the optical projection system of the First Example excluding the returning mirror. The projection distance Lb is on the optical axis. The shortest projection distance Lc is smaller than a sum of the projection distances La and Lb, satisfying the following condition:

$$La+Lb>Lc$$

The shortest projection distance Lc is a distance in which a 48-inch image is projected. The projection distances of the First Example are shown in the following Table 8.

TABLE 8

| La | 123.4 |
|---|---|
| Lb | 124.6 |
| La + Lb | 248.0 |
| Lc | 241.4 |

As seen from the table, the distance Lb from the first optical system 2 to the free-form surface mirror 4 is larger than the distance La from the image display element 1 to a lens surface closest to the imaging plane. Thereby, the first optical system 2 can be downsized, leading to downsizing the optical projection system 100 and the image projector. Also, the shortest projection distance is smaller than the distances La+Lb from the image display element 1 to the free-form surface mirror 4, as described above.

To shorten the projection distance, a wide angle-of-view projection optical system is required. However, it can be said that in general the larger the angle of view, the larger the size of the optical system. By forming the optical projection system to satisfy the relation of the projection distances La, Lb, Lc, the compact-size optical projection system and projector and a reduced projection distance are realized.

Next, the optical property of the optical projection system 100 of the First Example is described. FIG. 5 shows the angle of view numbers 1 to 25 of image display regions on the image display element 1 with the optical axis AX of the first optical system 2 set to an original point. The following Table 9 shows X and Y coordinates of the image display regions corresponding to the angle of view numbers. Only the coordinates of X>0 are considered since X axis is symmetric to Y axis.

TABLE 9

| ANGLE OF VIEW NO. | X | Y |
|---|---|---|
| 1 | 0 | 1.541 |
| 2 | 0 | 3.701 |
| 3 | 0 | 5.861 |
| 4 | 0 | 8.021 |
| 5 | 0 | 10.181 |
| 6 | -1.728 | 1.541 |
| 7 | -1.728 | 3.701 |
| 8 | -1.728 | 5.861 |
| 9 | -1.728 | 8.021 |
| 10 | -1.728 | 10.181 |
| 11 | -3.456 | 1.541 |
| 12 | -3.456 | 3.701 |
| 13 | -3.456 | 5.861 |
| 14 | -3.456 | 8.021 |
| 15 | -3.456 | 10.181 |
| 16 | -5.184 | 1.541 |
| 17 | -5.184 | 3.701 |
| 18 | -5.184 | 5.861 |
| 19 | -5.184 | 8.021 |
| 20 | -5.184 | 10.181 |
| 21 | -6.912 | 1.541 |
| 22 | -6.912 | 3.701 |
| 23 | -6.912 | 5.861 |
| 24 | -6.912 | 8.021 |
| 25 | -6.912 | 10.181 |

Imaging Performance

Figure 6:
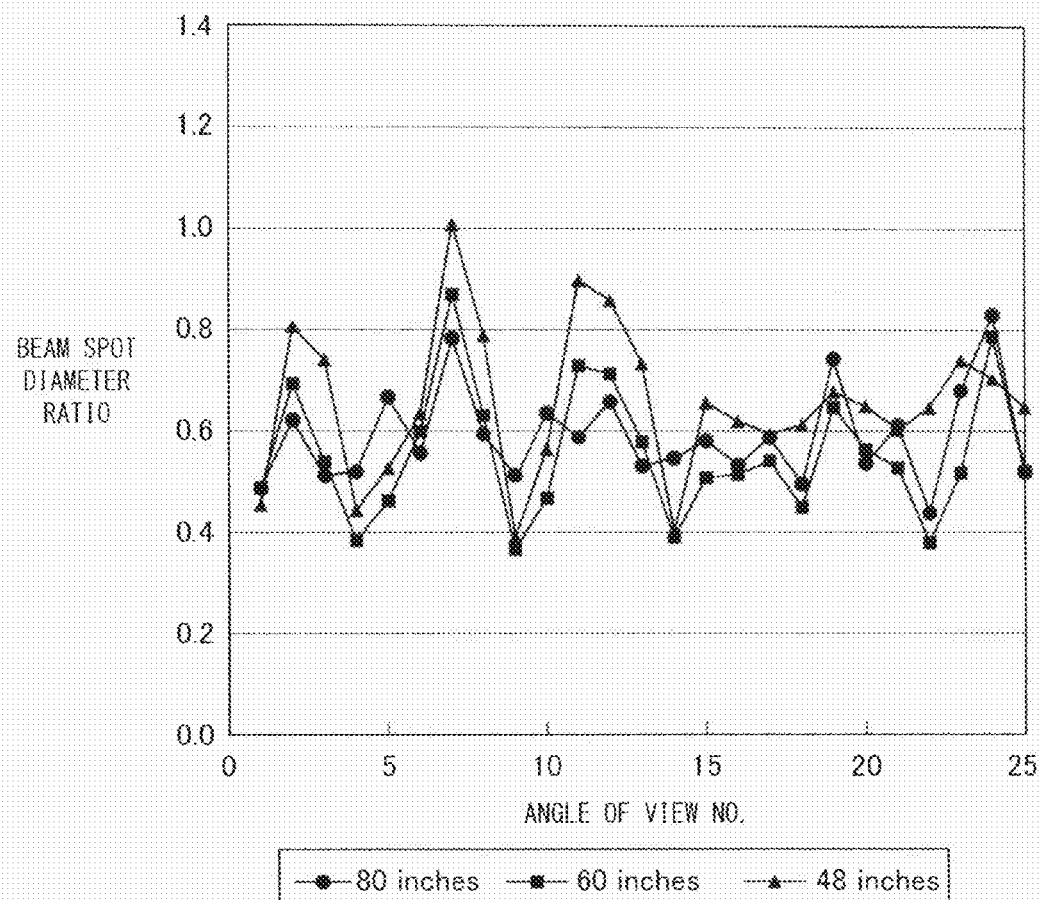
FIG. 6 is a graph showing beam spot diameter ratios of projected image sizes of 80, 60, and 48 inches on a screen at the angle of view numbers in FIG. 5.

FIG. 6 is a graph showing beam spot diameter ratios of projected image sizes of 80, 60, and 48 inches at the angle of view numbers in FIG. 5, in which abscissa axis indicates angle of view numbers and vertical axis indicates beam spot diameter ratio. Beam spot diameter ratio refers to RMS spot diameter ratio relative to one pixel on the screen. RMS spot diameter ratio $\sigma 2$ is calculated by the following expression:

$$\sigma 2 = \Sigma \{W\lambda \int\int [(x(\lambda;xp,yp)-[x])2+(y(\lambda;xp,yp)-[y])2]dxp\text{-}dyp\}/\Sigma W\lambda \quad (4)$$

where $x(\lambda; xp, yp)$ is an x-coordinate of an image plane passing a pupil point (xp, yp) and tracked with a wavelength $\lambda$, $y(\lambda; xp, yp)$ is a y-coordinate of this image plane, [y] is a mean value of y, and $W\lambda$ is a weight given to the wavelength $\lambda$. The sum ($\Sigma$) is of three color RGB wavelengths $\lambda$. One pixel on the screen refers to one pixel at screen resolution of WXGA (1280×800).

In the First Example the sizes of one pixel are 1.58, 1.18, and 0.95 mm relative to the projected image sizes, 80, 60, and 48 inches, respectively. At the beam spot diameter ratio of 1.0 or less, aberrations are considered to be properly corrected. In FIG. 6 the beam spot diameter ratio falls in a range of 0.4 to 1.0 so that aberrations are properly corrected.

Distortion

Figure 7:
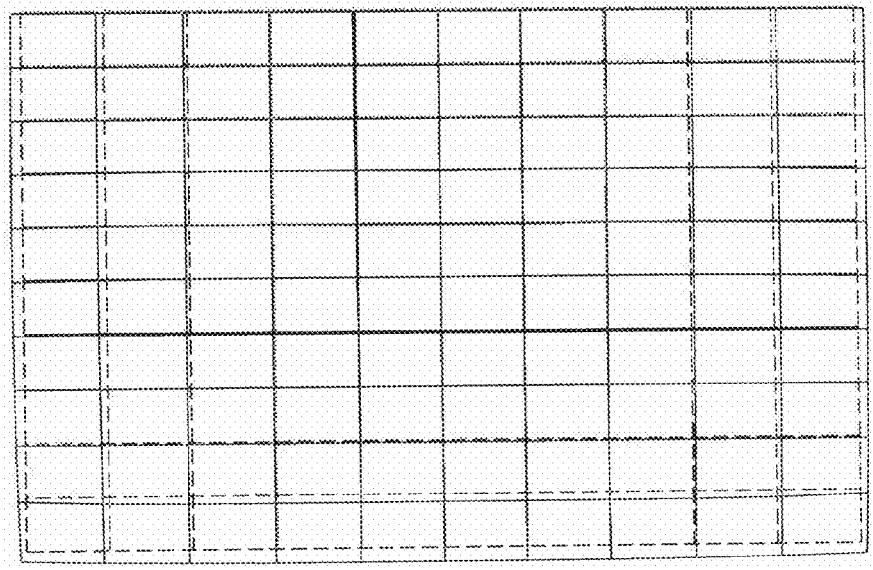
FIG. 7 shows a distorted shape of a projected image on a screen when projection size is 60 inches.

FIG. 7 shows a distortion of an image on the screen when a 60-inch image is projected by the projection optical system of the First Example. In the drawing an ideal screen size is indicated by the broken line and a distortion on the screen is indicated by the solid line. It is apparent from FIG. 7 that the optical projection system according to the First Example can reduce a distortion of a projected image. Further, by use of the free-form surface lens as shaped above, it is able to reduce a change in the curvedness in accordance with a temperature change, although an example of calculated values is not provided. The following Table 10 shows a distortion amount PV in the top side, bottom side, and right and left sides of an image when the projection sizes are 80, 60, and 48 inches.

TABLE 10

| | TOP SIDE PV | BOTTOM SIDE PV | RIGHT AND LEFT SIDES PV |
|---|---|---|---|
| 80" | 0.62 mm | 0.65 mm | 0.41 mm |
| 60" | 0.30 mm | 0.26 mm | 0.12 mm |
| 43" | 0.42 mm | 0.43 mm | 0.27 mm |

It is seen from the table that a distortion amount is smallest when the projection size is 60 inches.

Depth of Field on the Screen

Figure 10:
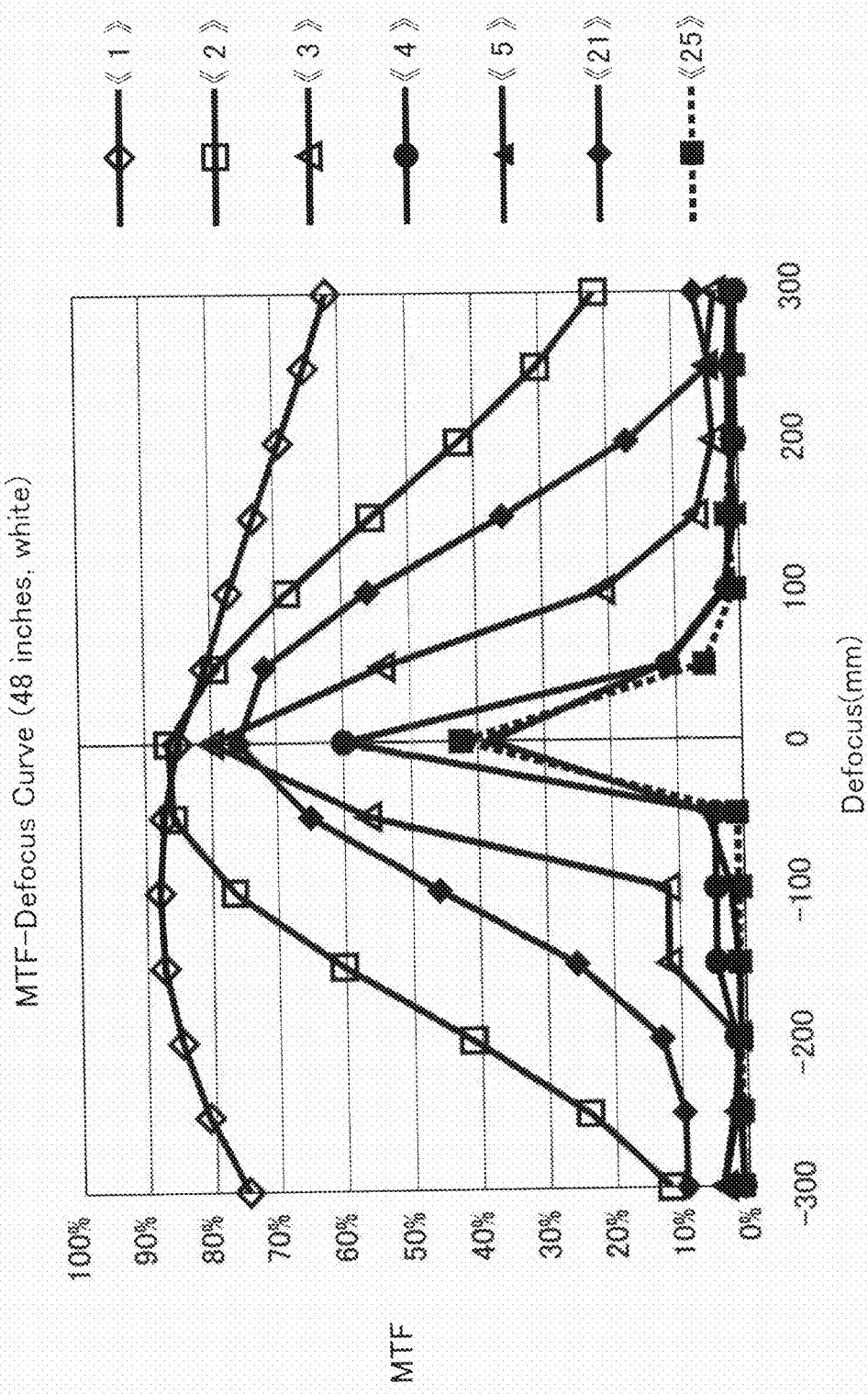
FIG. 10 is a graph showing a MTF-Defocus curve of a projected image at the angle of view in FIG. 5 and abscissa axis indicates defocus (mm) and vertical axis indicates MTF (%)

FIG. 10 is a graph showing MTF-defocus curves at the angle of view No. 1 to 5, 21, and 25 in FIG. 5, in which abscissa axis indicates defocus and vertical axis indicates MTF (Modulation Transfer Function). MTS is obtained from a white image of projection size 48 inches in Y-direction. As seen from the graph, MTF is highest and depth of field is largest (wide curve) at a position corresponding to the angle of view No. 1. In this position MTF is largely degraded if defocus occurs due to a variation in the elements and parts of the optical system and an assembling error. The projection optical system of the First Example uses the free-form surface lens to achieve a reduction in the size, projection distance and distortion, however, defocus due to birefringence inside the plastic free-form surface lens is likely to cause a degradation in the MTS especially at peripheral angle of view at small depth of field. A lens in a larger thickness is more likely to suffer from birefringence. Meanwhile, a too thin lens can exert only weak refracting power. Therefore, it is difficult to form a free-form surface lens in a balanced manner. According to the First Example it is possible to prevent birefringence from occurring in a portion of the free-form surface lens corresponding to the angle of view at shallow depth of field by forming the portion in question in a thin thickness. Thereby, high MTF can be obtained on the entire screen.

FIGS. 14A, 14B are cross section views of an image projector according to a sixth embodiment, showing the structure and optical paths by way of example. The image projector according to the sixth embodiment is different from the first embodiment in that the second optical system 7 is configured to exclude the returning mirror 3. The returning mirror 3 is a plan mirror so that the lens arrangement of FIGS. 14A, 14B is feasible depending on the layout of the image projector. The optical property of the image projector in the sixth embodiment is the same as that in the first example. Shortening the distance Lb between the lens system and free-form surface mirror contributes to decreasing the size of the optical projection system along Z axis, that is, entire length, while contributing to decreasing the height (Y-direction) of the optical projection system in the first example.

Figure 11:
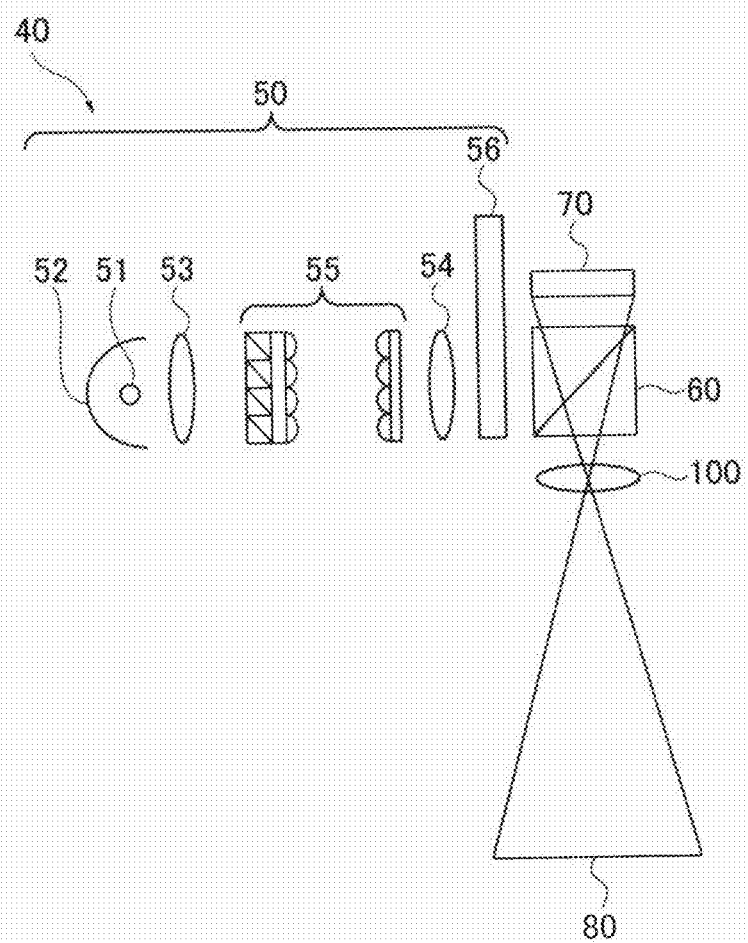
FIG. 11 is a cross section view of the overall structure of an image projector according to a fourth embodiment.

FIG. 11 is a cross section view of an image projector according to a fourth embodiment. In the drawing an image projector 40 comprises an illumination system 50, a separator 60, and an image forming element 70 in addition to the optical projection system 100. The image forming element 70 corresponds to the image display element 1 in the first example.

The illumination system 50 includes a light source 51, a reflector 52 provided adjacent to the light source 51, relay lenses 53, 54, and an optical integrator 55 to equalize illuminance of a directional light beam reflected by the reflector 52. Thereby, it can illuminate the surface of the image forming element 70 with even distribution. The reflector 52 can be integrated with the light source 51. The light source 51 can be a halogen lamp, xenon lamp, metal halide lamp, ultra-high pressure mercury lamp, or LED, for example. Further, the image projector 40 can include a color wheel 56 to convert the light beam to a color beam and control an image on the image forming element 70 in synchronization with the light conversion, to project color images. With use of a reflective-type liquid crystal image forming device, a polarization separator in combination with a polarizing beam splitter is additionally provided to separate an illumination path and a projection path. Thereby, more efficient illumination can be realized. With use of a DMD panel for the image forming element 70, a total reflection prism can be used to separate optical paths. Thus, an appropriate optical system can be adopted depending on a type of the image forming element 70. In the image projector 40 images are formed on the image forming element 70 in accordance with a modulation signal. The light from the light source 51 illuminates the image forming element 70 to form an image and the optical projection system 100 enlarges and projects the image on a screen 80.

Figure 12:
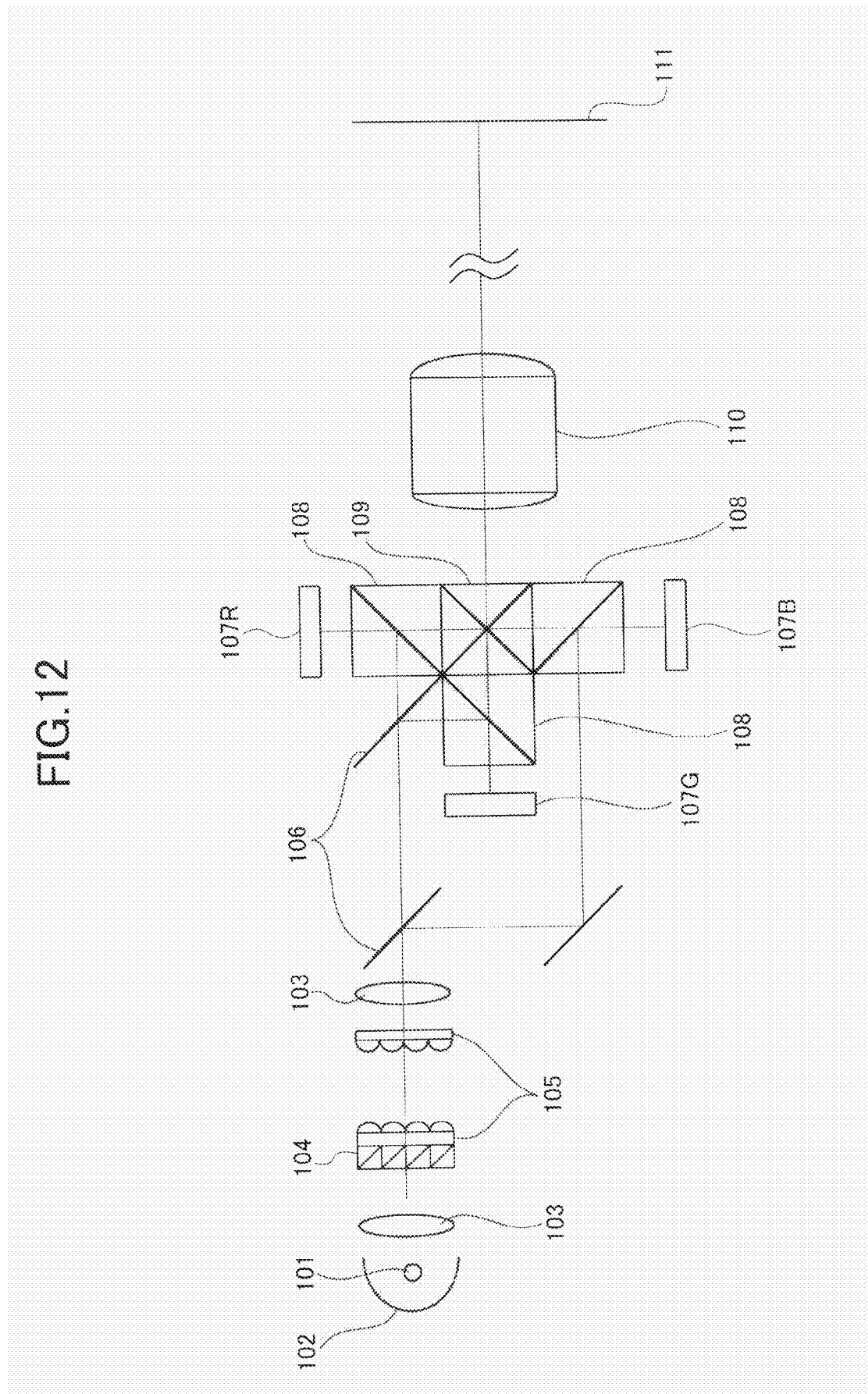
FIG. 12 is a cross section view of a color image projector according to a fifth embodiment.

FIG. 12 is a cross section view of the overall structure of a color image projector according to a fifth embodiment. The color image projector comprises red, green, and blue image forming elements 107R, 107G, and 107B and an optical projection system 110, as shown in the drawing. The image forming elements correspond to the image display element 1 in the first example. An illumination system includes a light source 101, a reflector 102 provided adjacent to the light source 101, a relay lenses 103, and an optical integrator 105 to equalize illuminance of a directional light beam reflected by the reflector 102. The illumination system illuminates the image forming elements 107R, 107G, 107B via an optical separator 106 and a polarization separator 108 which separate an illumination path and a projection path. The light reflected by the image forming elements 107R, 107G, 107B is synthesized again by a color synthesizer 109 to form a color image. Thereby, the optical projection system 110 can project a color image on a screen 111.

In the fifth embodiment it is necessary to set a long distance from the image forming elements 107R, 107G, 107B to the first surface of the first optical system of the optical projection system 110 because of the polarization separator 108 and color synthesizer 109. The color synthesizer can be selected in size to be containable in the image projector of the first example or the distance from the image forming element to the first optical system can be extended or shortened in accordance with the size of the color synthesizer. Both of the structures can realize downsizing and reduction of color aberration.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. An optical projection system to enlarge an image on an image display element and project the enlarged image onto a screen, comprising:
   the image display element;
   a first optical system including lens groups arranged in order from an image display element side, a lens barrel holding the lens groups, and a free-form surface lens rotationally asymmetric and made from plastic; and
   a second optical system including a curved mirror disposed after the first optical system, wherein
   the free-form surface lens is formed to have a thickness which decreases from an intersection point between a surface of the free-form surface lens and an optical axis of the first optical system to an outer periphery of the lens along a line extending to the outer periphery,
   a shape of the free-form surface lens is symmetric relative to an X axis and asymmetric relative to a Y axis, the X axis being along a long side of the image display element and the Y axis being along a short side of the image display element,
   an apex of the surface of the free-form surface lens is located at an intersection point between the X and Y axes and on the optical axis of the first optical system,
   an optical effective area of the free-form surface lens is $\pm X1$ along the X axis and from $+Y1$ to $-Y2$ along the Y axis, $Y1$ being smaller than $Y2$, and
   the thickness of the free-form surface lens is thickest at a reference point of the lens surface shape and thinnest at peripheral positions along the X and Y axes, the reference point being $X=0$, $Y=0$, the peripheral positions being $X=\pm X1$ and $Y=-Y2$.

2. The optical projection system according to claim 1, wherein
   the peripheral position along the Y axis is larger in thickness than the peripheral position along the X axis, the peripheral position along the Y axis being $X=0$, $Y=-Y2$, the peripheral position along the X axis being $X=\pm X1$, $Y=0$.

3. The optical projection system according to claim 1, wherein
   the free-form surface lens is placed furthest from the image display element in the first optical system.

4. The optical projection system according to claim 1, wherein
   the free-form surface lens includes agate at a top center.

5. The optical projection system according to claim 1, wherein
   a ratio of a thinnest portion and a thickest portion of the thickness of the free-form surface lens is 0.33 or more.

6. The optical projection system according to claim 1, wherein
   a shortest projection d stance of the optical projection system is set to satisfy the following relation:

$$(La+Lb)>Lc$$

where Lc is the shortest distance, La is a distance on the optical axis from the image display element to an apex of a lens surface of the first optical system furthest from the image display element, and Lb is a distance on the optical axis from the apex of the lens surface to the curved mirror.

7. The optical projection system according to claim 1, further comprising:
   a housing to integrally hold the first and second optical systems; and
   a dust-proof glass, wherein
   the optical projection system is sealed with the housing and dust-proof glass.

8. An image projector comprising:
   the optical projection system according to claim 1; and
   an illumination system.

9. An optical projection system to enlarge an image on an image display element and project the enlarged image onto a screen, comprising:
   the image display element;
   a first optical system including lens groups arranged in order from an image display element side, a lens barrel holding the lens groups, and a free-form surface lens rotationally asymmetric and made from plastic; and a second optical system including a curved minor disposed after the firs optical system, wherein the free-form surface lens is formed to have a thickness which decreases from an intersection point between a surface of the free-form surface lens and an optical axis of the first optical system to an outer periphery of the lens along a line extending to the outer periphery, and a shortest projection distance of the optical projection system is set to satisfy the following relation:

$(La+Lb)>Lc$ where Lc is the shortest distance, La is a distance on the optical axis from the image display element to an apex of a le s surface of the first optical system furthest from the image display element, and Lb is a distance on the optical axis from the apex of the lens surface to the curved mirror.

* * * * *